July 20, 1926.
C. F. JAEGER
1,593,079
POWER ATTACHMENT FOR AUTOMOBILES
Filed July 8, 1924    2 Sheets-Sheet 1
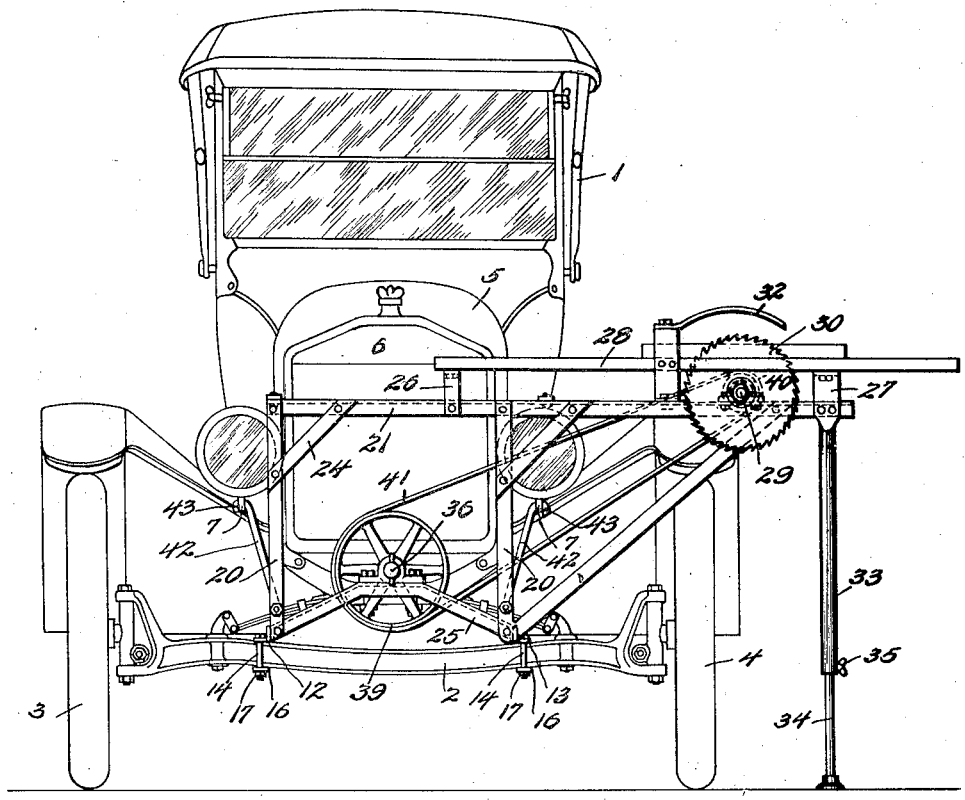
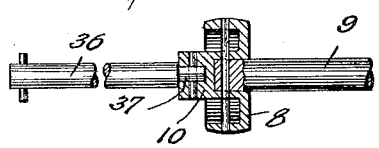
Inventor
Charles F. Jaeger
By H. H. Benjamin
Attorney July 20, 1926.
C. F. JAEGER
1,593,079
POWER ATTACHMENT FOR AUTOMOBILES
Filed July 8, 1924   2 Sheets-Sheet 2
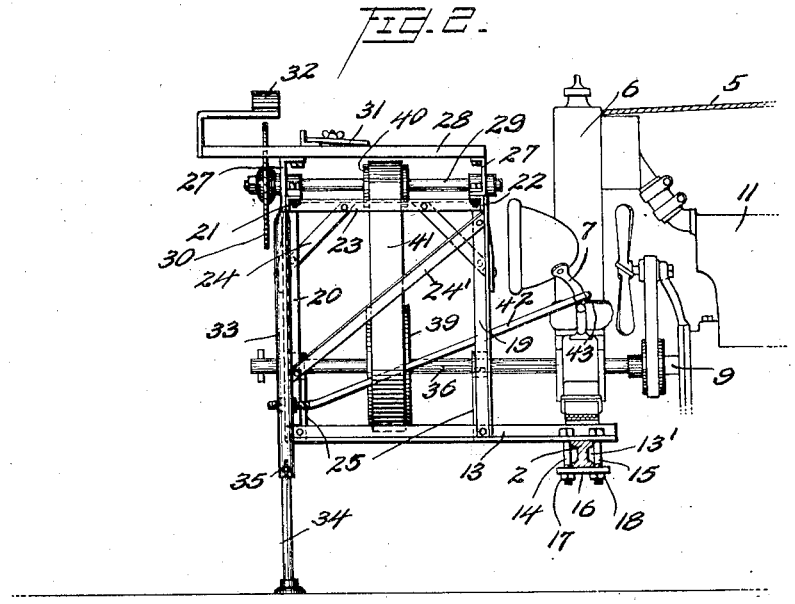
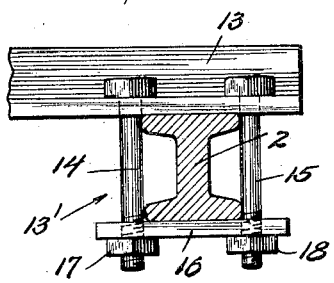
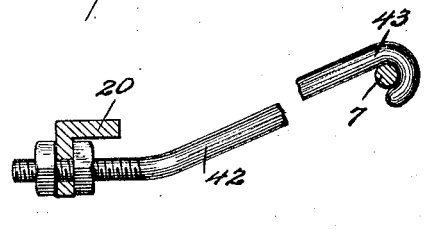
Charles F. Jaeger, Inventor
By H. H. Benjamin
Attorney Patented July 20, 1926.

1,593,079

UNITED STATES PATENT OFFICE.

CHARLES F. JAEGER, OF FERNDALE, MICHIGAN, ASSIGNOR TO JAEGER PORTABLE POWER CORPORATION, OF DETROIT, MICHIGAN, A CORPORATION OF MICHIGAN.

POWER ATTACHMENT FOR AUTOMOBILES.

Application filed July 8, 1924. Serial No. 724,842.

My invention relates to automobile attachments and particularly to an attachment for a standard type of automobile by which a machine tool may be carried in operative position by the automobile and driven by the power plant thereof.

I am aware that it is old in the art to provide saw attachments adapted to be driven from the power plants of automobiles and also which may be carried by the automobile but so far as I am aware none of these attachments provides means whereby the attachment may be carried by the automobile in continuous position for immediate use, but ready detachment, whereby the automobile provides not only the power plant but the running gear for the tool and this without in any way modifying the structure of the automobile or preventing it with the saw attached in operative position from being used for its customary purposes.

An object of my invention, therefore, is to provide a self contained saw attachment to a standard design of automobile which requires no structural changes in the automobile.

A further object of my invention is to provide such an attachment as may be continuously attached to the automobile without in any way interfering with the usual or customary uses of the automobile or in any way reducing its load space or in any way preventing customary access to any of its operative parts.

A further object of my invention is to provide such an attachment as will be carried by the automobile in such manner that the automobile supplies the running gear for the attachment whereby the attachment may be moved in operative position from place to place as the circumstances of its particular work may require.

A further object of my invention is to so support the attachment as to bring the strains upon the automobile structure well within the wheel tracks thereof to prevent stress for which the automobile structure was not designed from being exerted upon its structural members, while at the same time to support the saw in an offset position relative to the body of the automobile whereby the device is maintained in a position for convenient use without danger of interference from close proximity of the automobile structure or danger of injury to the automobile from contact with material used in the tool.

An example of a preferred embodiment of my invention is illustrated in the accompanying drawings, in which:

Figure 1 is a front elevation of an automobile with the attachment operatively connected thereto.

Figure 2 is a side elevation of the fore part of an automobile with the attachment operatively connected thereto, parts of the automobile structure being broken away or removed to more clearly illustrative the structure.

Figure 3 is a detail partly in section illustrating the axle connection.

Figure 4 is a detail partly in section illustrating the lamp bracket stay.

Figure 5 is a detail partly in section illustrating the shaft connection.

In the drawings, 1 is an automobile of a familiar type having a front axle 2, front wheels 3 and 4, a hood 5, a radiator 6, lamp brackets 7, a crank shaft 9, a crank clutch 10, a clutch collar 8, and an engine 11, all of these elements being standard unmodified parts of the particular type of automobile illustrated.

Secured to and resting upon the front axle 2 and projecting forwardly therefrom, I provide a pair of parallel horizontal spaced apart arms 12 and 13, said arms each being secured to the axle by a yoke 13′ comprising bolts 14 and 15, a plate 16 and nuts 17 and 18. Said yokes are so positioned upon the axle as to bring said arms well within the wheel tracks of the automobile. Riveted or otherwise suitably secured to said arms are a pair of vertical parallel rear frame supports 19 and beyond these secured at the forward end of said arms are a pair of vertical, parallel front frame supports 20.

Connecting the forward frame supports 20 and extending beyond them to the right (in Fig. 1) is a horizontal frame member 21, said frame member extending to a point considerably beyond the right hand (in Fig. 1) wheel track of the automobile.

Connecting the rear frame supports 19 and coextensive with the frame member 21 is a frame member 22.

Joining the upper parts of the frame supports 19 with the upper parts of the opposite frame supports 20 are cross frame members 23.

Connecting the lower ends of the frame supports 20 is a bridge piece 25, said bridge piece having angularly upward extending ends and a horizontal center. A like bridge piece connects the lower ends of the frame supports 19. These bridge pieces serve not only as bracing for the frame but provide journal saddles as hereinafter mentioned.

Connecting the frame supports to the frame members I provide angled cross bracing 24 and connecting the forward and rear frame supports to each other I provide angled bracing 24'.

I prefer to construct the frame work mentioned of that structural steel shape known as "angle iron" not only to provide a rigid structure but because a frame of this construction presents little wind resistance and does not interfere with the effective surface of the automobile radiator.

Projecting upward vertically from the frame members 21 and 22 I provide brackets 26 and 27 and upon these brackets I support a horizontal saw table 28.

Journaled in any preferred manner upon the frame members 21 and 22, beyond the right hand (in Fig. 1) wheel tread of the automobile is a saw shaft 29 carrying a circular saw 30, said saw being positioned in front of the frame member 21.

I prefer to provide the saw table with a gauge 31 and a saw guard 32.

Connected with the saw table and the frame member 21, preferably by the bracket 27, is a tubular member and telescoping within the same is an adjustable leg 34. Means shown as a set screw 35 retain this leg in elevated or extended position.

Journaled in any preferred manner upon the bridge pieces 25 is an extension shaft 36 positioned diametrically opposite and forming an extension of the crank shaft of the automobile engine 11 and connected thereto by the collars of the clutch 10, the latter being the usual clutch collar provided for the cranking handle, which is removed. The end of the shaft 36 has a pier 37 which has a wedging fit in the clutch collar by which the extension shaft may be operatively connected to the crank shaft or disengaged therefrom. The usual cranking handle of the automobile, not shown, may be fitted to the end of the extension shaft 38 if desired.

Upon the extension shaft 36 is provided a pulley 39 and opposite this upon the saw shaft 29 is a pulley 40, these pulleys carrying a belt 41 by which the saw may be driven.

Secured to the frame supports 19 at a position adjacent to their lower ends are a pair of stay rods 42. These stay rods have hooked ends 43 to engage the usual lamp brackets 7 of the automobile. The rods are connected to the frame supports by adjustable means shown as an adjustable nut connection, whereby the stay rods 42 may be put under tension thereby slightly flexing the frame and preventing vibration.

The operation of my device is as follows:

The attachment is always in operative position upon the automobile, although readily removable therefrom. When it is desired to use the saw, the set screw 35 is loosened permitting the leg 34 to touch the ground. The set screw is then tightened. Connection is made between the crank shaft and the extension shaft at the clutch 10 and the engine started, thus driving the saw.

When it is desired to drive the automobile from place to place or to change the position of the saw, it is merely necessary to raise the leg 34 and move the autotmobile upon its wheels, the shaft connections remaining engaged or may be disengaged as desired.

It will be seen that no structural changes are necessary in the automobile itself and the attachment interferes in no way with the ordinary uses of the automobile.

While I have described and illustrated my invention in connection with a circular saw to which it is particularly well adapted, it is not my intention to limit the application of my invention to saws, as it is, with slight modification adapted to be used with any shaft driven implement or tool adapted to be supported by an automobile.

What I claim to be new is:

1. In a device of the character described, arms adapted to be supported from and in forwardly projecting relation to the front axle of an automobile, a lattice frame so supported on said arms as to be positioned in advance of and spaced from the hood of the automobile between the wheel tracks thereof, a saw table overhanging one side of said frame whereby a saw journaled in said frame is positioned at the side of and beyond the wheel track of the automobile with its cutting plane transverse to the trackway of the automobile so that both ends of the table will be free for receiving and delivering the work, and means for connecting the saw operatively to an extension of the crank shaft of the automobile power plant.

2. A vehicle attachment including a frame having a pair of spaced substantially horizontally disposed transversely extending bars in advance of the radiator of the vehicle projecting laterally of the latter, upright members in substantial alignment with the radiator of the vehicle supporting said bars, longitudinally extending rails connected to pairs of said upright members having their rear ends resting on the front axle of the vehicle, means extending between the vehicle and frame for retaining said rails on said axle, a saw carried by the lateral portions of said bars, and a driving connection between said saw and the crank shaft of the vehicle including parts carried by said frame.

3. A vehicle attachment including a frame having a pair of spaced substantially horizontally disposed bars in advance of the radiator of the vehicle projecting laterally of the latter, upright members in substantial alignment with the radiator supporting said bars, longitudinally extending rails connected to pairs of said upright members having portions thereof carried by the front axle of the vehicle, means extending between the vehicle and frame for retaining said rails on said axle, bridge bars connecting pairs of said upright members, a saw journaled in bearings on the lateral portions of the first mentioned bars, a shaft journaled in bearings on the bridge bars in substantial alignment with and connected to the crank shaft of the vehicle, and a driving connection between said shaft and saw.

4. The combination with a motor vehicle, of an attachment therefor including a frame having spaced longitudinally extending bars mounted on the forward axle of the vehicle, a cross bar carried by said longitudinally extending bars, a drive shaft in alignment with and connected to the crank shaft of the vehicle journaled in bearings on said cross bar, spaced cross bars mounted on the bars aforesaid above said shaft, a tool shaft parallel to the crank shaft of the vehicle carried by the last mentioned cross bars, and a driving connection between said first and last mentioned shafts.

5. The combination with a motor vehicle, of an attachment therefor including a frame having spaced longitudinally extending bars mounted on the front axle of the vehicle, spaced transversely extending bars carried by the bars aforesaid, a drive shaft in alignment with and connected to the crank shaft of the vehicle journalled in bearings on said transversely extending bars, spaced cross bars mounted above and carried by the bars aforesaid and having portions extending laterally of the vehicle, a tool having a driving shaft parallel to the crank shaft of the vehicle journaled in bearings on the last mentioned bars, a work table extending longitudinally of said cross bars, and a driving connection between the first and last mentioned shafts.

In testimony whereof I affix my signature.

CHARLES F. JAEGER.